United States Patent [19]

Wang

[11] Patent Number: 5,558,357

[45] Date of Patent: Sep. 24, 1996

[54] TROLLEY FRAME FOLDABLE IN ONE-STEP OPERATION

[75] Inventor: Teresa Wang, Taichung, Taiwan

[73] Assignee: Sci-Tw International Inc., Taichung, Taiwan

[21] Appl. No.: 518,754

[22] Filed: Aug. 24, 1995

[51] Int. Cl.⁶ .................................................. B62B 7/08
[52] U.S. Cl. .................. 280/647; 280/655.1; 280/658
[58] Field of Search .................................. 280/640, 642, 280/647, 651, 655.1, 657, 658, 47.371, 47.38

[56] References Cited

U.S. PATENT DOCUMENTS

| | | | |
|---|---|---|---|
| 5,356,171 | 10/1994 | Schmidlin et al. | 280/658 |
| 5,364,119 | 11/1994 | Leu | 280/647 |
| 5,460,399 | 10/1995 | Baechler et al. | 280/650 |
| 5,468,009 | 11/1995 | Egman et al. | 280/658 |

*Primary Examiner*—Richard M. Camby
*Attorney, Agent, or Firm*—Harness, Dickey & Pierce, P.L.C.

[57] ABSTRACT

A foldable trolley frame includes an elongated main body, a slide member sleeved movably on the main body, two transverse axle units provided on two sides of the main body and respectively and pivotally connected to the main body, a pair of connecting rods interconnecting the axle unit and the slide member to position the axle units on two sides of the main body, and a pair of support rods which have front end portions pivoted to the main body and rotatable about a horizontal axis which is located near the front end portion of the main body. A U-shaped support has two inclined arms pivoted to the rear end portion of the support rods at the upper ends and rotatable about an upper horizontal axis, and a horizontal section which interconnects the inclined arms and which is connected pivotally to the slide member in such a manner that the arms extend forwardly and upwardly from the horizontal section. The horizontal section of the U-shaped support is rotatable about a lower horizontal axis which is below the upper horizontal axis. The trolley frame can be folded in a one-step operation by moving the U-shaped support frontwardly on the main body so that the axle units and the support rods are adjacent to and generally parallel with the main body.

4 Claims, 12 Drawing Sheets

TROLLEY FRAME FOLDABLE IN ONE-STEP OPERATION

BACKGROUND OF THE INVENTION

1. Field of the Invention

The invention relates to a trolley frame, more particularly to a foldable trolley frame which can be folded in a one-step operation so as to reduce the total height and width of the foldable trolley frame.

2. Description of the Related Art

There are several kinds of foldable trolleys available on market. However, after removal of the wheels from the frame of a conventional foldable trolley, it is time-consuming and troublesome to fold the trolley frame for reducing the total height and width of the frame since it takes several actions to achieve the same.

SUMMARY OF THE INVENTION

The main object of the present invention is to provide a foldable trolley frame which can be folded in a one-step operation so as to reduce the total height and width of the frame.

Accordingly, a foldable trolley frame of the present invention includes an elongated straight main body, a slide member, two transverse axle units, a pair of connecting rods, a pair of support rods, a U-shaped support and a push member. The straight main body has a front end portion and a rear end portion. The slide member is sleeved movably on the main body and can be moved frontwardly to a storage position on the main body. The transverse axle units are located on two sides of the main body, each of which consists a parallelogram linkage that includes an inner link member secured to the rear end portion of the main body in such a manner that the two parallelogram linkages has a common inner link member. Each of the axle units further includes two parallel transverse links which have inner ends connected pivotally to the inner link member, and an outer link member which is connected pivotally to the outer ends of the transverse links. Each of the outer link members has a transverse hole formed therethrough so as to be adapted to mount an axle of a wheel rotatably within the transverse hole. Each of the connecting rods has a first end connected pivotally to the slide member, and a second end connected pivotally to a corresponding one of the outer link members so as to position the parallel transverse links on the main body. Thus, the transverse links are parallel to the main body when the slide member is moved to the storage position in such a manner that the holes of the outer link members are transverse to the main body. The support rods have front end portions pivoted to the front end portion of the main body in such a manner that the support rods can rotate about a horizontal axis which is located near the front end portion of the main body. The U-shaped support have two inclined arms pivoted to the rear end portions of the support rods at the upper ends thereof in such a manner that each of the inclined arms is rotatable about an upper horizontal axis which is located near the upper end of the arm, and a horizontal section which interconnects the lower ends of the arms and which is connected pivotally to the slide member in such a manner that the arms extend forwardly and upwardly from the horizontal section and that the horizontal section can rotate about a lower horizontal axis which is located near the horizontal section below the upper horizontal axis. The push member has a front end portion connected pivotally to the rear end portions of said support rods and rotatable about a horizontal axis.

The trolley frame can be folded in a one-step operation by moving the slide member to the storage position, so that the parallel transverse links and the support rods are adjacent to and generally parallel with the main body. Thus, the total height and width of the trolley frame is reduced.

BRIEF DESCRIPTION OF THE DRAWINGS

Other features and advantages of the present invention will become more apparent in the following detailed description of the preferred embodiments with reference to the accompanying drawings, in which.

DETAILED DESCRIPTION OF THE PREFERRED EMBODIMENTS

Figure 1:
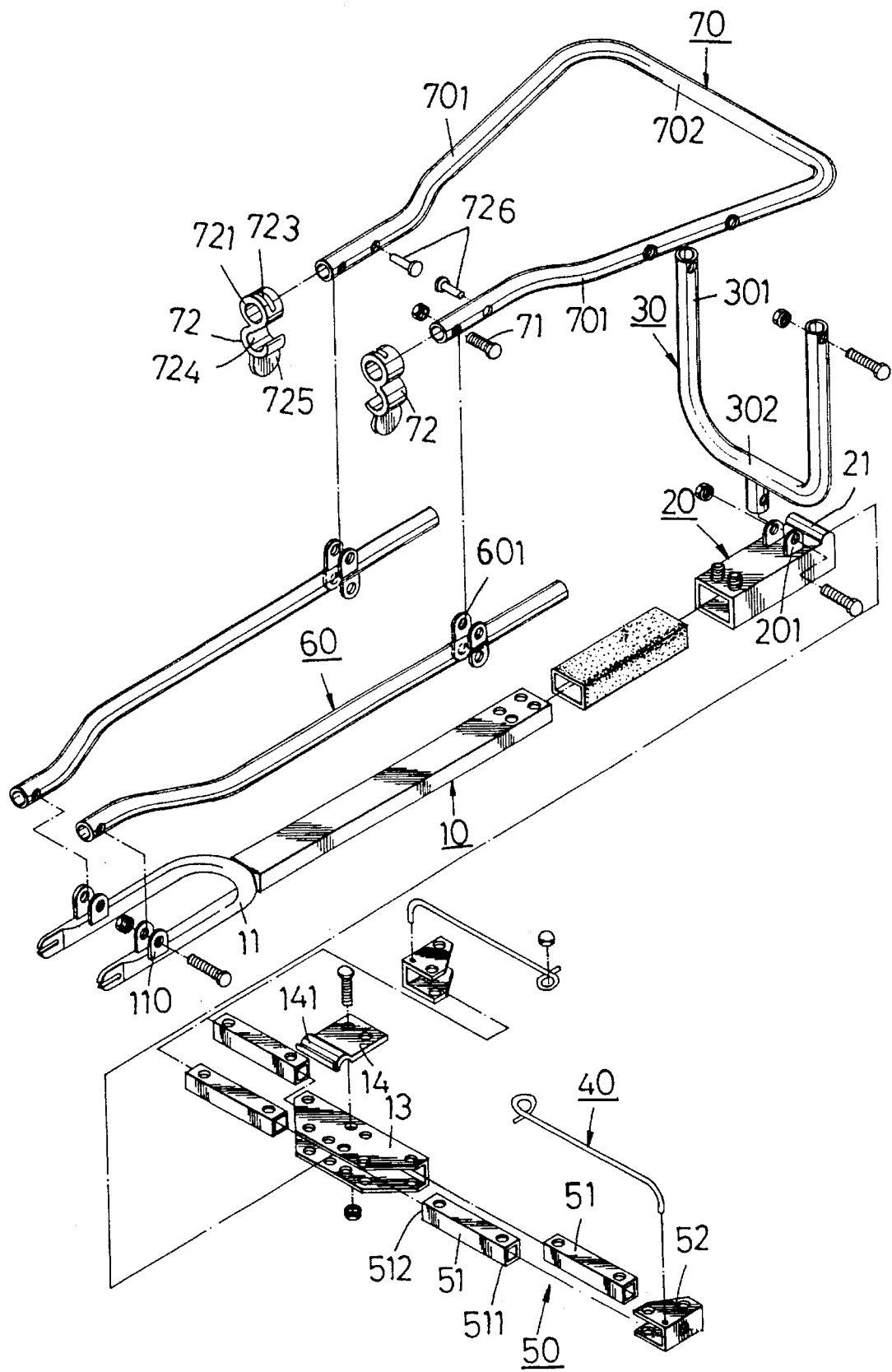
FIG. 1 is an exploded view of a foldable trolley frame according to the present invention.
Figure 2:
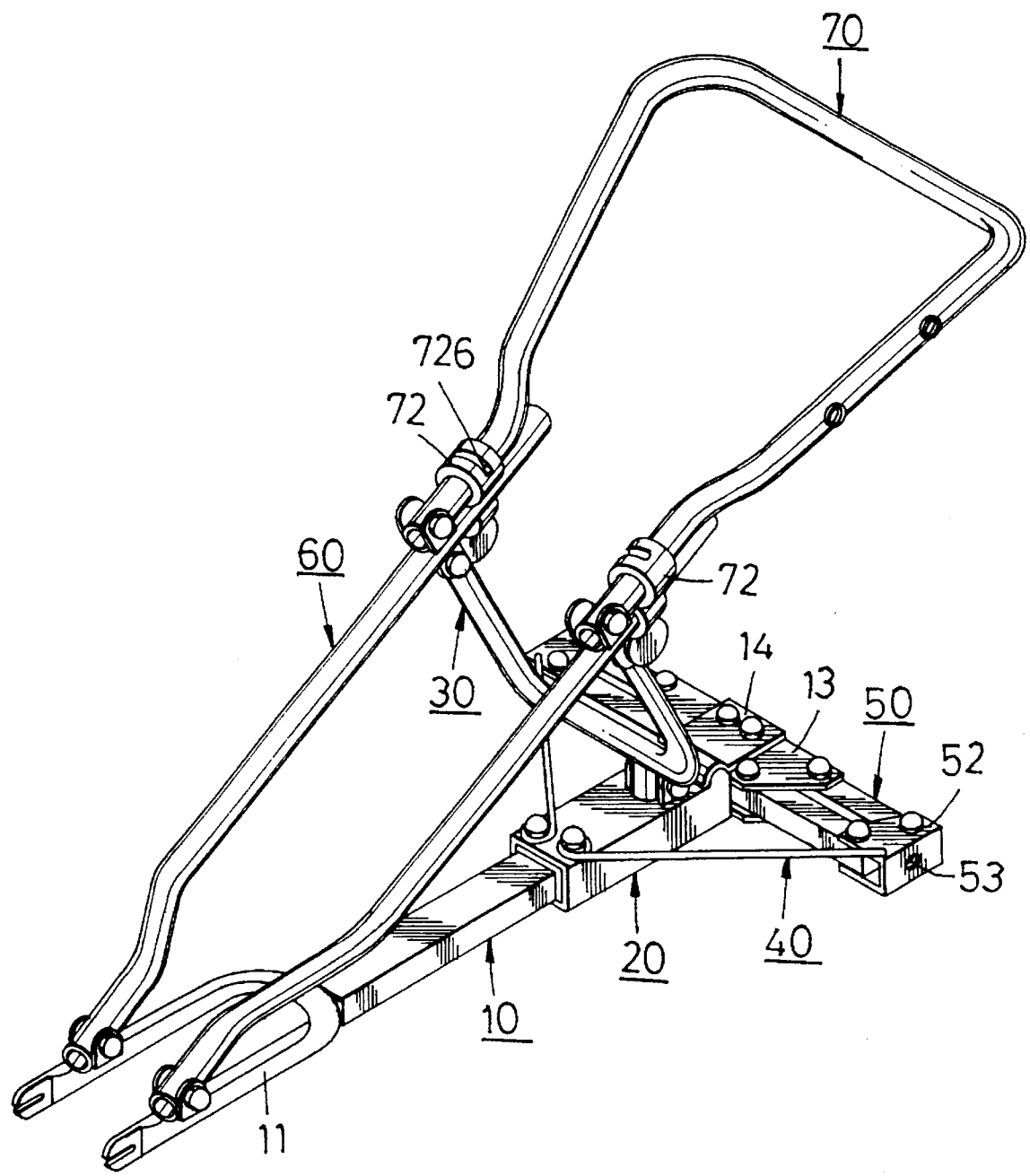
FIG. 2 is a perspective view of the foldable trolley frame of FIG. 1.
Figure 3:
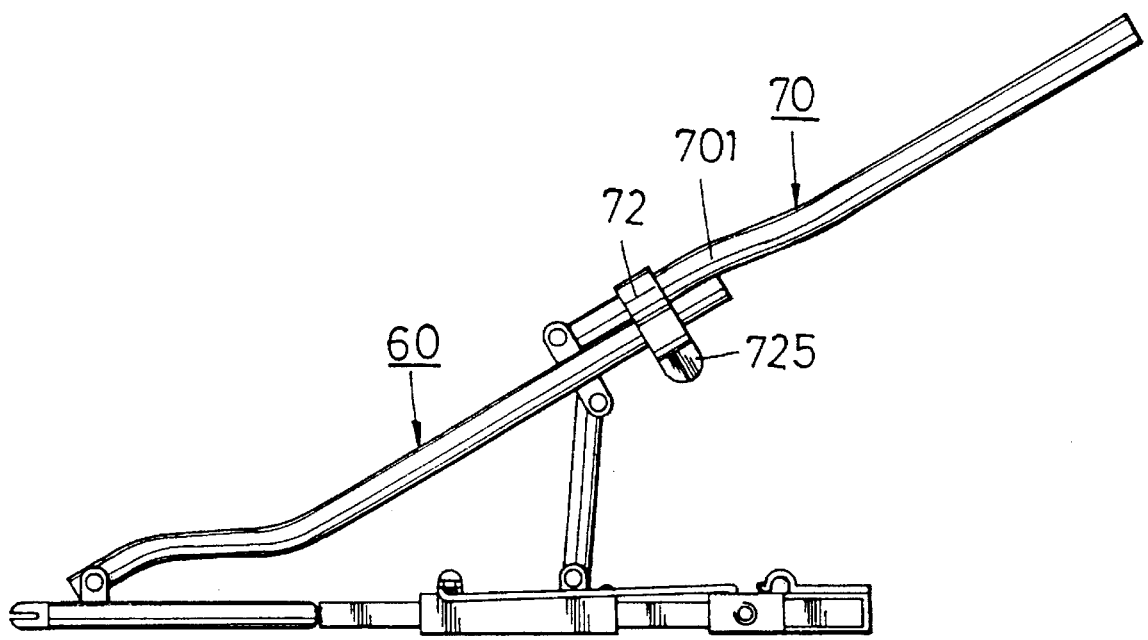
FIG. 3 is an elevational side view of the foldable trolley frame shown in FIG. 2.

Referring to FIGS. 1 and 2, a foldable trolley frame of the present invention includes an elongated straight main body 10, a slide member 20, a U-shaped support 30, a pair of connecting rods 40, two transverse axle units 50, a pair of support rods 60, and a push member 70.

As illustrated, the straight main body 10 has a front end portion provided with a fork 11, and a rear end portion. The slide member 20 is sleeved movably on the main body 10 and has a protrusion 21 on a rear end portion thereof. The transverse axle units 50 are located on two sides of the main body 10. Each of the axle units 50 consists of a parallelogram linkage which includes an inner link member 13 secured to the rear end portion of the main body 10 by means of a spring plate 14 that is screwed on the inner link member 13 and on the main body 10, and that has a curved portion 141 for engaging the protrusion 21 of the slide member 20 so as to position the slide member 20 on the main body 10, in such a manner that the two parallelogram linkages has a common inner link member 13. Each of the axle units 50 further includes two parallel transverse links 51 which have inner ends 512 connected pivotally to the inner link member 13, and an outer link member 52 connected pivotally to the outer ends 511 of the transverse links 51. Each outer link member 52 has a transverse hole 53 formed therethrough so as to be adapted to mount an axle of a wheel rotatably within the transverse hole 53 thereof.

Figure 4:
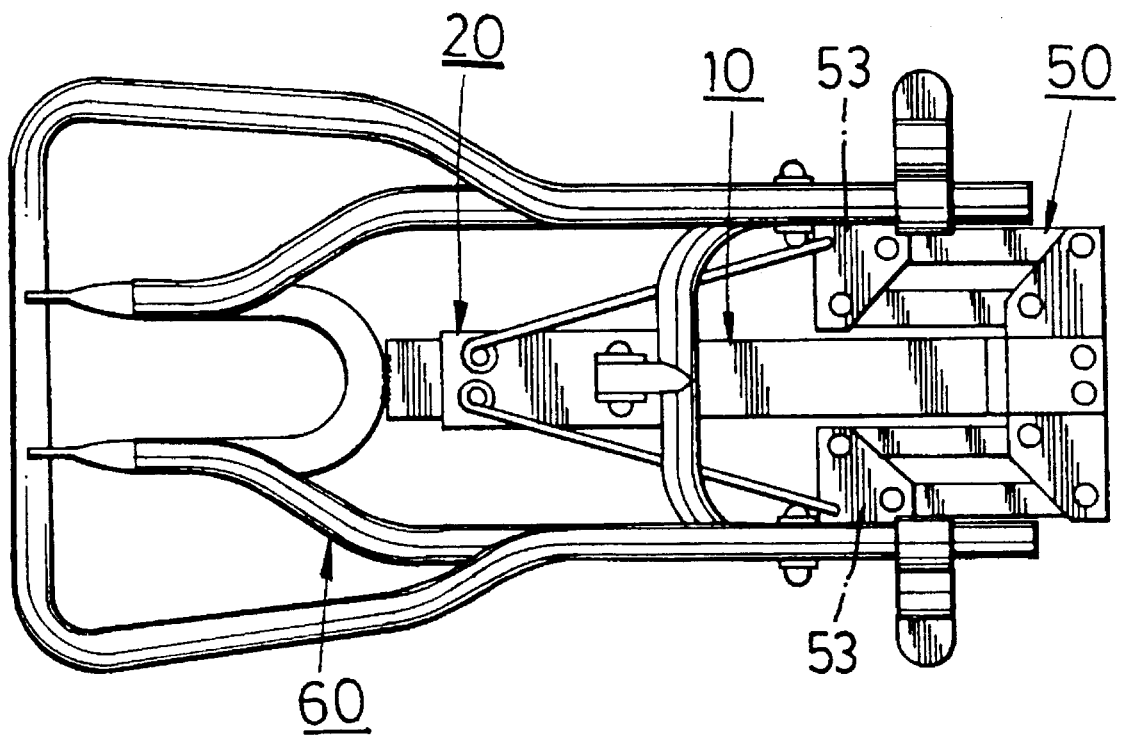
FIG. 4 is an elevational top view of the foldable trolley frame of the present invention when in a folded position.

Each of the connecting rods 40 has a first end sleeved rotatably around a retaining pin of the slide member 20, and a second end extended into a pivot hole of a corresponding one of the outer link members 52 so as to position the parallel transverse links 51 on the main body 10. Thus, the transverse links 51 are parallel to the main body 10 when the slide member 20 is moved to the storage position shown in FIG. 4, in such a manner that the holes 53 of the outer link members 52 are transverse to the main body 10.

The support rods 60 have front end portions respectively pivoted to the ears 110 of the fork 11 in such a manner that the support rods 60 can rotate about a horizontal axis which is located near the front end portion of the main body 10. The U-shaped support 30 has two inclined arms 301 pivoted to the lower portions of the ears 601 of the rear end portions of the support rods 60 in such a manner that each of the inclined arms 301 is rotatable about an upper horizontal axis which is located near the upper end of the arm 301, and a horizontal section 302 which interconnects the lower ends of the arms 301 and which is connected pivotally to the spaced ears 201 of the slide member 20, in such a manner that the arms 301 extends forwardly and upwardly from the horizontal section 302 (see FIG. 1) and that the horizontal section 302 can rotate about a lower horizontal axis which is located near the horizontal section 302 below the upper horizontal axis.

The push member 70 is generally U-shaped and includes two connecting arms 701 located at the front end portion thereof, and a push rod 702 which interconnects the rear ends of the connecting arms 701. Each of the connecting arms 701 is pivoted to an upper section of the ears 601 of a corresponding one of the support rods 60 by a nut and screw set 71. Each of the connecting arms 701 is further provided with a fastener 72 which has a circular ring 721 located at an upper portion thereof and sleeved rotatably on a corresponding one of the connecting arms 701 of the push member 70, in such a manner that the fastener 72 is prevented from movement on the arm 701 of the push member 70 by means of a positioning pin 726 that extends through the wall 723 of the circular ring 721 and the corresponding one of the connecting arms 701, a C-shaped retaining ring 724 that has an upper end integrally formed with a lower end of the circular ring 721 and that is sleeved on the support rod 60, and a pull tab 725 having an upper end integrally formed with a lower end of the C-shaped retaining ring 724. When the pull tabs 701 are pulled outwardly, the C-shaped retaining rings 724 are rotated about the connecting arms 701 so as to be removed from the support rods 701 respectively. Thus, the fasteners 72 respectively and releasably lock the connecting arms 701 on the support rods 60 so as to assist in pushing the trolley, and can be rotated about the connecting arms 701 so as to unlock the connecting arms 701 from the support rods 60, thereby permitting the push member 70 to be rotated so as to overlap on the support rods 60.

Figure 5:
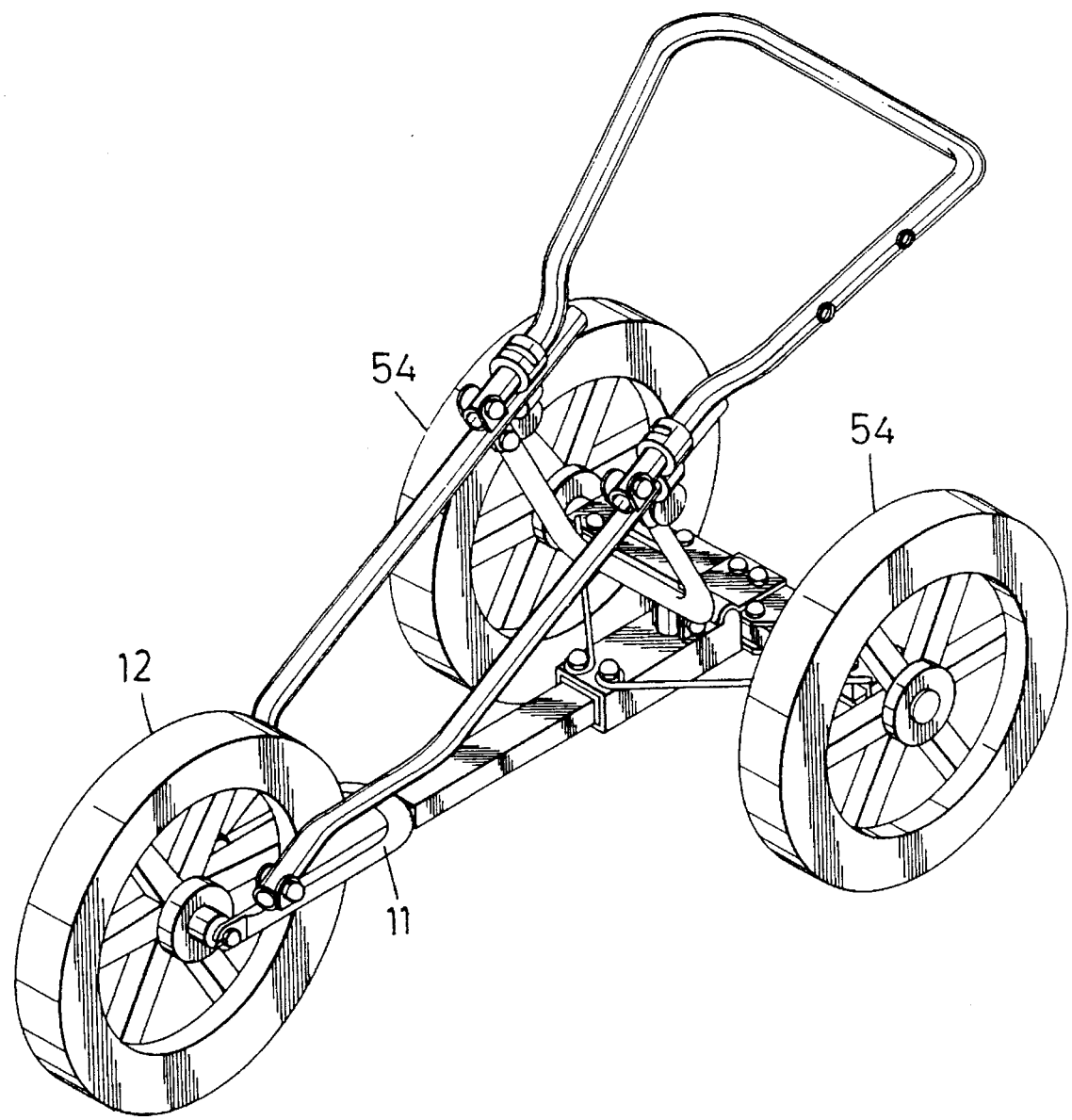
FIG. 5 is a perspective view of the foldable trolley frame of the present invention with wheels mounted thereon.
Figure 6:
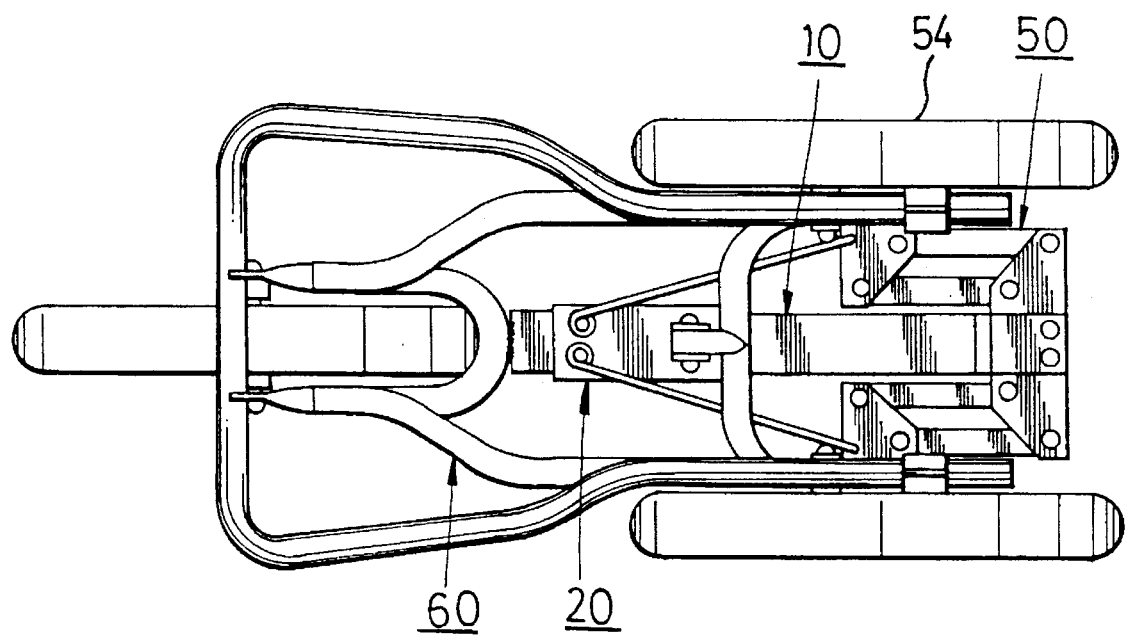
FIG. 6 is an elevational top view showing the foldable trolley frame of FIG. 5 when in a folded position.
Figure 7:
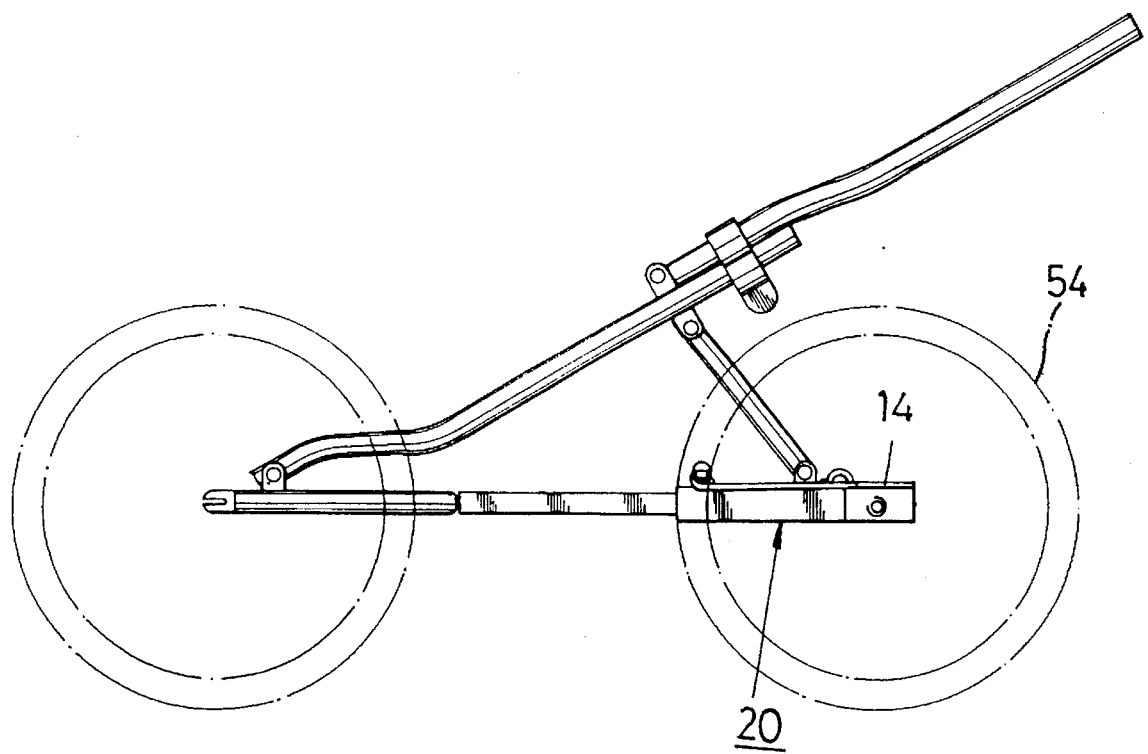
FIG. 7 is an elevational side view of the foldable trolley frame of FIG. 5.

Referring to FIG. 5, a front wheel 12 is journalled on the fork 11 while the axles of two rear wheels 54 are attached respectively and rotatably into the axle holes 53 of the outer link members 52 (see FIG. 1) so as to be held therein. A seat (not shown) for carrying a baby can be attached on the support rods 60. As illustrated in FIG. 6, when desired, the trolley frame can be folded in a one-step operation by moving the slide member 20 frontwardly from the normal position of FIGS. 5 and 7 against the depression of the spring plate 14 to the storage position of FIGS. 4 and 6, so that the parallel transverse links 51 and the support rods 60 are adjacent to and generally parallel with the main body 10. In this manner, the total height and width of the trolley frame is reduced. At this time, the push member 70 can be turned forwardly to the position of FIG. 6 in order to reduce the total length of the trolley.

In the present preferred embodiment, a wear-resistant sleeve 22 (see FIG. 1) is sleeved around the main body 10 and is confined between the slide member 20 and the main body 10 so as to avoid wear between the slide member 20 and the main body 10 due to sliding movements therebetween.

Figure 8:
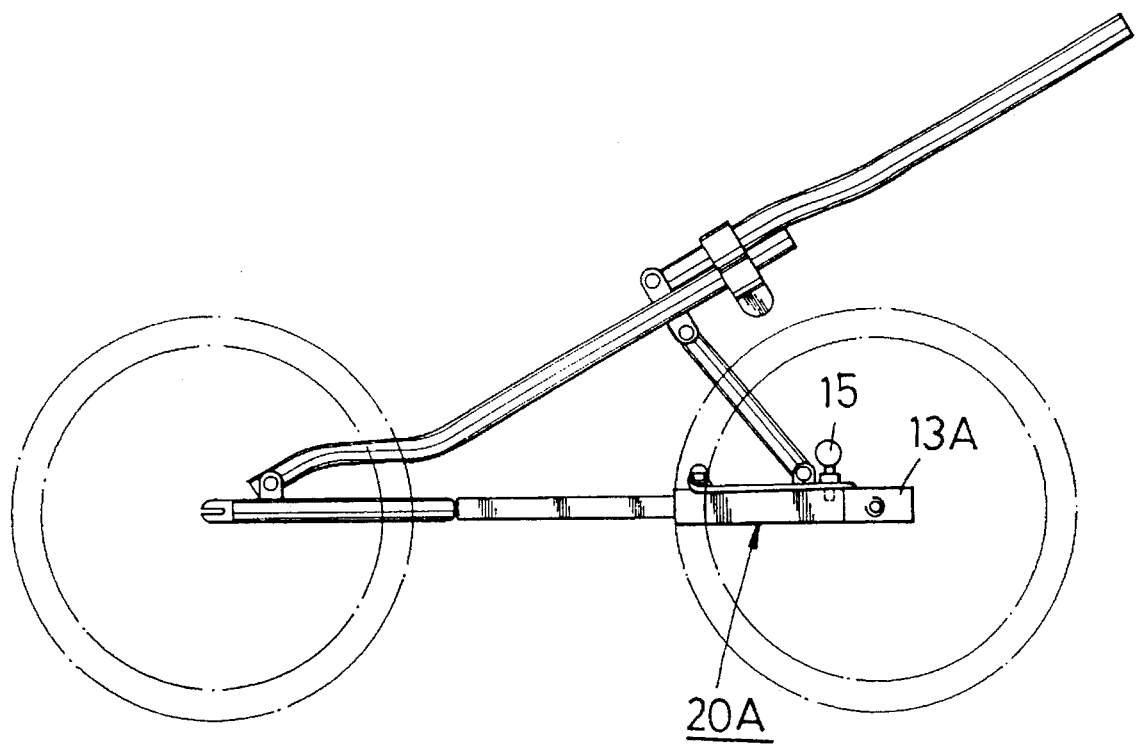
FIG. 8 is an elevational side view of a modified foldable trolley frame of the present invention with wheels mounted thereto and shown by phantom lines.

Referring to FIG. 8, a modified trolley frame of the present invention is shown. The only difference relative to the previous embodiment resides in that, on each side of the main body, an engaging bolt 15 extends through a hole of the slide member 20A and the hole of the inner link member 13A so as to interconnect the same, in such a manner that removal of the engaging bolt 15 from the slide member 20A and the inner link member 13A permits separation thereof.

Figure 9:
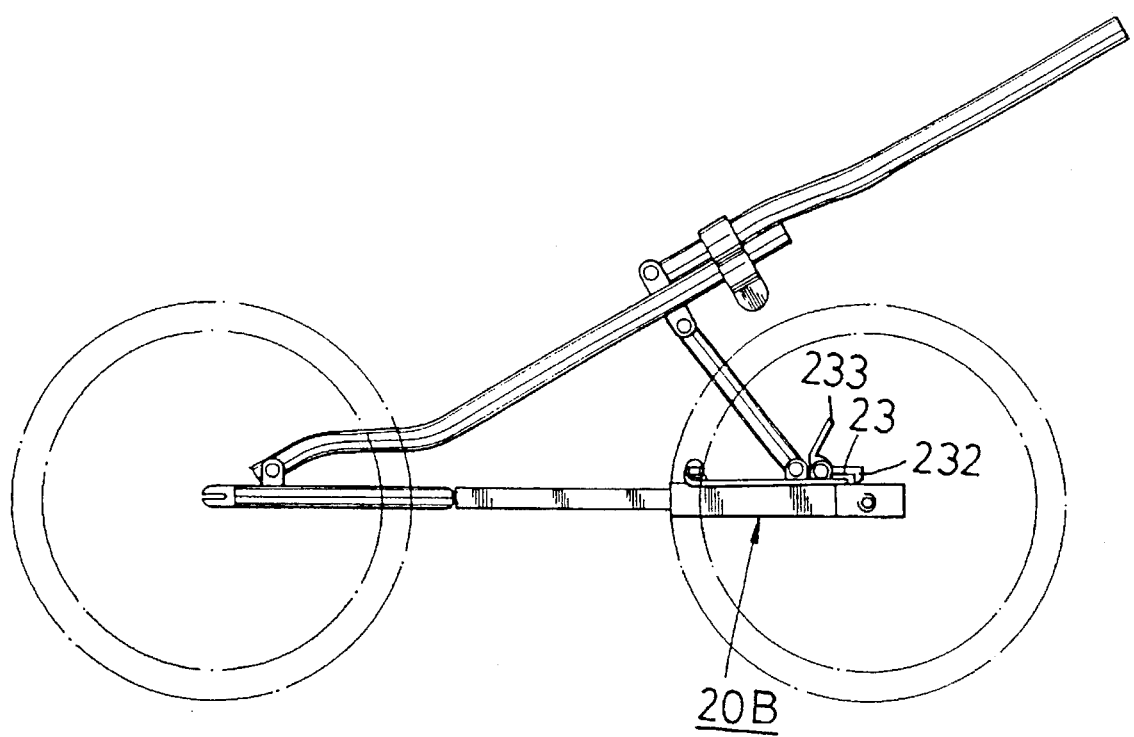
FIG. 9 is an elevational side view of another modified foldable trolley frame of the present invention with wheels mounted thereto and shown by phantom lines.
Figure 10:
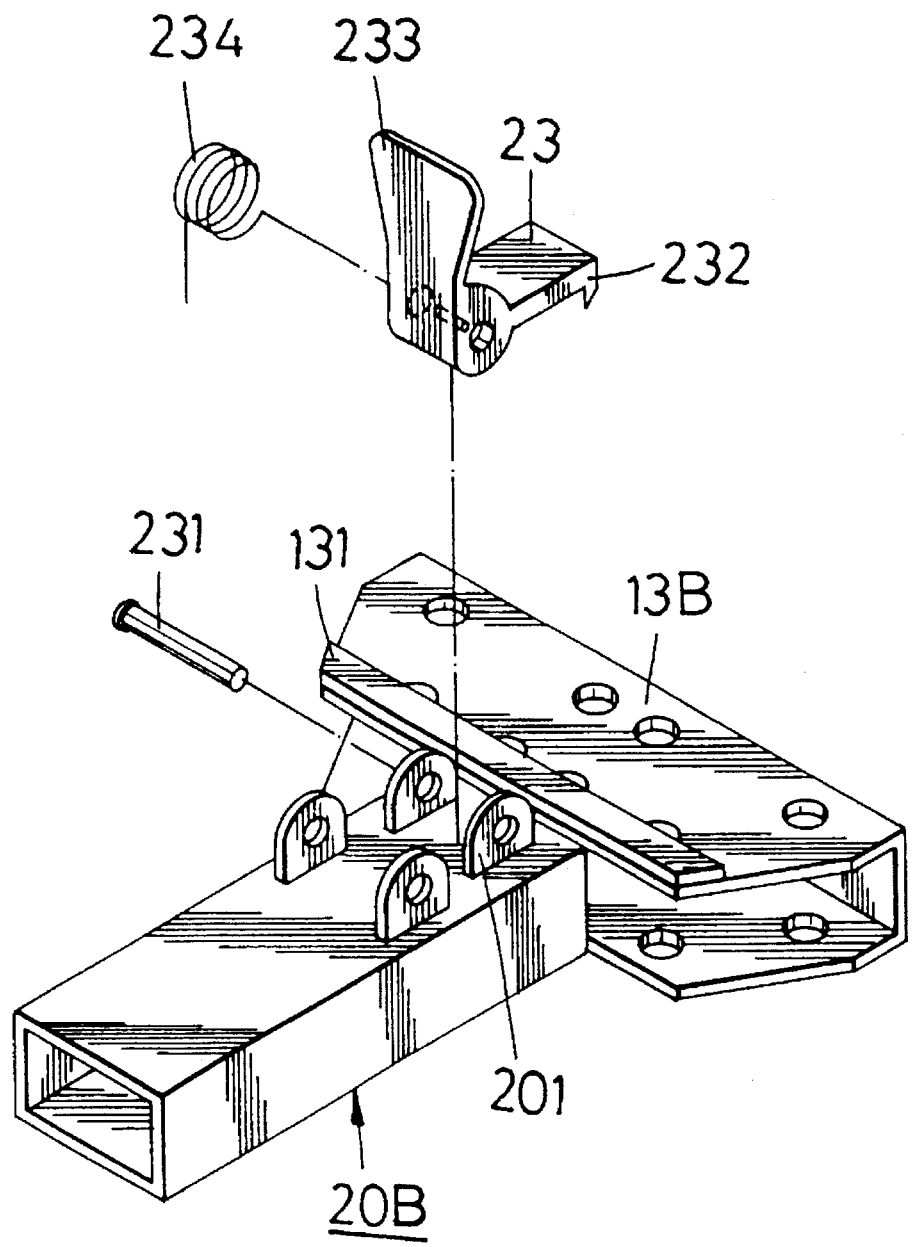
FIG. 10 is an exploded view showing a spring-loaded connecting unit employed in the construction of the foldable trolley frame of FIG. 9.

Referring to FIGS. 9 and 10, in another modified foldable trolley, the inner link member 13B has an elongated and transverse rib 131 formed thereon. A hook unit 23 with a torsion spring 234 is mounted on the ears 201 of the slide member 20B by means of a locking pin 231, in such a manner that a hook 232 of the hook unit 23 is biased by the spring 234 to engage the rib 131. A frontward press on the actuator 233 against the biasing action of the spring 234 can release the slide member 20B from the inner link member 13B.

Figure 11:
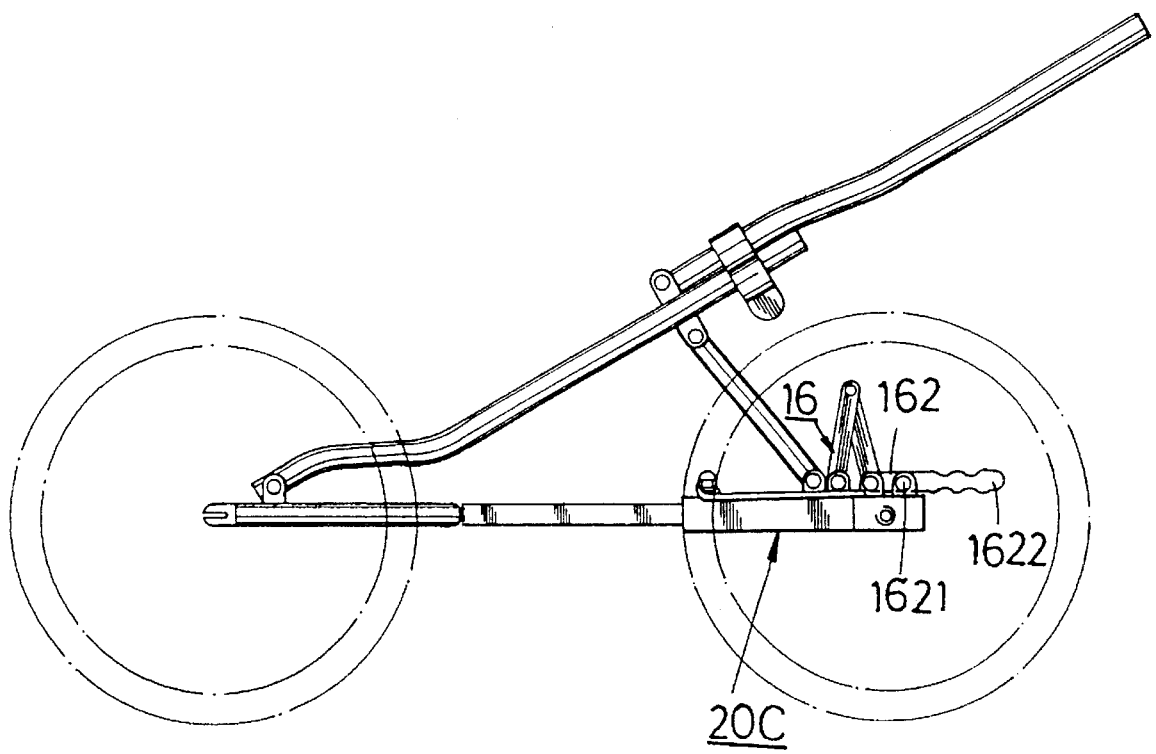
FIG. 11 is an elevational side view of still another modified foldable trolley frame of the present invention with wheels mounted thereto and shown by phantom lines.
Figure 12:
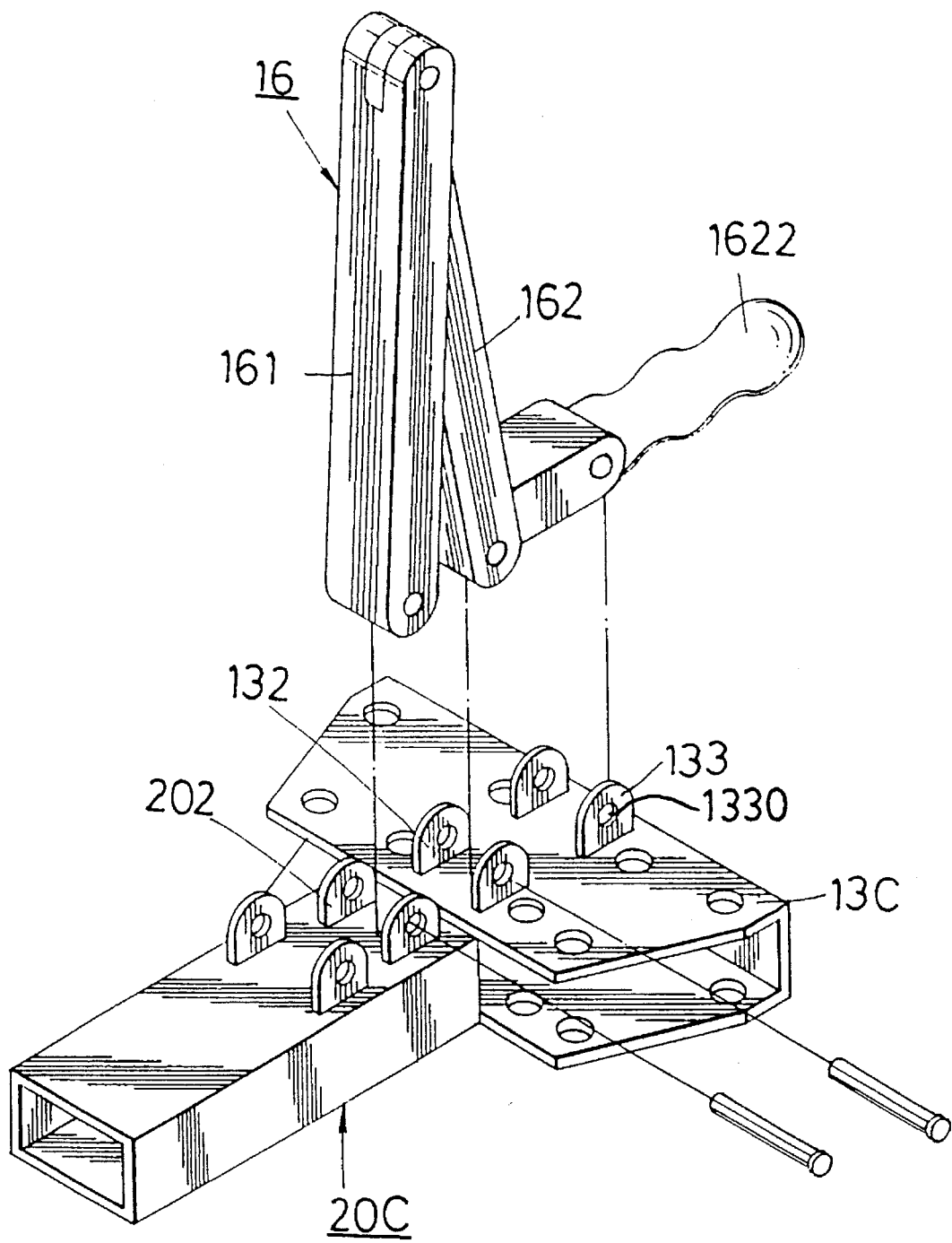
FIG. 12 is an exploded view showing a connecting unit employed in the construction of the foldable trolley frame of FIG. 11.

Referring to FIGS. 11 and 12, in still another modified foldable trolley frame of the present invention, the inner link member 13C is formed with two pair of ears 132, 133. A vertical connector 16 includes two pivotally interconnected links 161, 162 which have lower portions respectively pivoted into the ears 202 of the slide members 20C and the ears 132 of the inner link member 13C. The link 162 has a rearward projection provided with spring-loaded balls 1621 which extend into the holes 1330 of the ears 133 so as to retain the link 162 on the inner link member 13C. To release the slide member 20C from the inner link member 13C, the link 162 can be pivoted in a frontward direction by lifting an actuator 1622 that extends from the link 162. The features and objects of the modified trolleys are the same as those of the first preferred embodiment.

With the present invention thus explained, it is obvious to those skilled in the art that various modifications and variations can be made without departing from the scope and spirit thereof. It is therefore intended that the invention be limited only as in the appended claims.

I claim:

1. A foldable frame for a trolley, comprising:

an elongated straight main body having a front end portion and a rear end portion;

a slide member sleeved movably on said main body and being movable frontwardly to a storage position on said main body;

two axle units located on two sides of said main body and each of which consisting of a parallelogram linkage including an inner link member secured to said rear end portion of said main body in such a manner that said parallelogram linkages has a common inner link member, each of said axle units further including two parallel transverse links having inner ends connected pivotally to said inner link member, and an outer link member connected pivotally to outer ends of said transverse links and having a transverse hole formed therethrough so as to be adapted to mount an axle of a wheel rotatably within said transverse hole, said transverse links being located in parallel with said main body when said slide member is moved to the storage position in such a manner that said transverse holes of said outer link members are transverse to said main body;

a pair of connecting rods, each of said connecting rods having a first end connected pivotally to said slide member, and a second end connected pivotally to a corresponding one of said outer link members so as to position said parallel links on said main body;

a pair of inclined lengthwise extending support rods having front end portions pivoted to said front end portion of said main body in such a manner that said support rods can rotate about a horizontal axis;

a U-shaped support having two inclined arms pivoted to rear end portions of said support rodslat upper ends thereof in such a manner that each of said arms is rotatable about an upper horizontal axis which is located near the upper end of said arm, and a horizontal section interconnecting lower ends of said arms and connected pivotally to said slide member, in such a manner that said arms extends forwardly and upwardly from said horizontal section and that said horizontal section can rotate about a lower horizontal axis which is located near said horizontal section below said upper horizontal axis; and a push member having a front end portion connected pivotally to the rear end portions of said support rods and rotatable about a horizontal axis to overlap on said support rods so as to reduce total length of said frame;

whereby, said trolley frame can be folded in a one-step operation by moving said slide member to said storage position so that said parallel links and said support rods are adjacent to and generally parallel with said main body, thus reducing total height and width of said trolley frame.

2. The foldable frame as defined in claim 1, wherein said push member is U-shaped and includes two parallel connecting arms disposed at said front end portion thereof, and a push rod interconnecting rear ends of said connecting arms, each of said connecting arms being provided with a fastener which locks releasably said connecting arms on a respective one of the support rods, so as to assist in pushing said trolley frame, and which can be rotated about a respective one of said connecting arms so as to unlock said connecting arm from the respective one of the support rods.

3. The foldable frame as defined in claim 2, wherein each of said fasteners has a circular ring located at an upper portion thereof and sleeved rotatably on a corresponding one of said connecting arms of said push member, a C-shaped retaining ring having an upper end integrally formed with a lower end of said circular ring and sleeved on a corresponding one of said support rods, a pull tab having an upper end integrally formed with a lower end of said C-shaped retaining ring, and a positioning pin extending through a wall of said circular ring and the corresponding one of said connecting arms so as to prevent said fastener from movement on said push member, whereby, by pulling said pull tabs outwardly, said C-shaped retaining rings can be rotated about said connecting arms respectively for removal from said support rods respectively.

4. The foldable frame as defined in claim 1, further comprising a wear-resistant sleeve sleeved on said main body and confined between said main body and said slide member so as to avoid wear between said slide member and said main body due to sliding movements therebetween.

* * * * *

UNITED STATES PATENT AND TRADEMARK OFFICE
CERTIFICATE OF CORRECTION

PATENT NO.    :    5,558,357
DATED         :    September 24, 1996
INVENTOR(S)   :    Teresa Wang It is certified that error appears in the above-indentified patent and that said Letters Patent is hereby corrected as shown below:

Column 5, line 26, Claim 1, "rodslat" should be --rods at--.

Signed and Sealed this

Seventeenth Day of December, 1996

Attest:

BRUCE LEHMAN

*Attesting Officer*    *Commissioner of Patents and Trademarks*